(12) United States Patent
Ebadian et al.

(10) Patent No.: US 11,267,647 B2
(45) Date of Patent: Mar. 8, 2022

(54) SECURITY BIN

(71) Applicant: Phiston Technologies, Inc., Miami, FL (US)

(72) Inventors: M. Ali Ebadian, Miami, FL (US); Raul Travieso, Miami, FL (US); Douglas Graham, Miramar, FL (US)

(73) Assignee: Phiston Technologies, Inc., Miami, FL (US)

( * ) Notice: Subject to any disclaimer, the term of this patent is extended or adjusted under 35 U.S.C. 154(b) by 68 days.

(21) Appl. No.: 16/923,265

(22) Filed: Jul. 8, 2020

(65) Prior Publication Data

US 2022/0009709 A1    Jan. 13, 2022

(51) Int. Cl.
| | |
|---|---|
| *B65F 1/16* | (2006.01) |
| *B65D 55/02* | (2006.01) |
| *B65F 1/14* | (2006.01) |
| *B62B 3/00* | (2006.01) |
| *B62B 3/02* | (2006.01) |
| *B62B 5/00* | (2006.01) |
| *B65D 6/34* | (2006.01) |
| *B65D 43/16* | (2006.01) |
| *B65D 21/06* | (2006.01) |

(52) U.S. Cl.
CPC ............ *B65F 1/1615* (2013.01); *B62B 3/004* (2013.01); *B62B 3/02* (2013.01); *B62B 5/0096* (2013.01); *B65D 11/28* (2013.01); *B65D 21/064* (2013.01); *B65D 43/166* (2013.01); *B65F 1/1473* (2013.01); *B65F 1/1646* (2013.01); *B65D 55/02* (2013.01); *B65D 2251/1083* (2013.01); *B65F 2210/138* (2013.01); *B65F 2250/114* (2013.01)

(58) Field of Classification Search
CPC ...... B65D 11/28; B65D 43/166; B65D 55/12; B65D 2251/1083; B65F 1/1615; A47G 29/1248
See application file for complete search history.

(56) References Cited

U.S. PATENT DOCUMENTS

| | | | | |
|---|---|---|---|---|
| 1,916,642 | A  * | 7/1933 | Shelby | B65D 55/12 217/57 |
| 3,938,630 | A  * | 2/1976 | March | A45C 5/00 190/24 |
| 7,324,321 | B2 | 1/2008 | Olliges | |
| 7,852,590 | B1 | 12/2010 | Olliges | |
| 8,064,183 | B2 | 11/2011 | Olliges | |
| 8,794,559 | B1 | 8/2014 | Olliges et al. | |

(Continued)

FOREIGN PATENT DOCUMENTS

| | | | | |
|---|---|---|---|---|
| CA | 2718202 | C  * | 10/2017 | ............ B65F 1/1615 |
| FR | 2591570 | A1 * | 6/1987 | ............ B65D 55/12 |

*Primary Examiner* — Mollie Impink
(74) *Attorney, Agent, or Firm* — McHale & Slavin, P.A.

(57) ABSTRACT

A security bin formed from a commercially available rectangular plastic bin having removable lids that are secured to the bin to prevent unauthorized access to the items placed therein. The lids are locked with a tamperproof flap and latching hook to prevent access to the bin contents. Plexiglass windows allow viewing of materials placed within the bin. Spring pins allow ease of lid movement for access to the bin contents, or allow removal of the windows to allow stacking for storage and shipping. An optional scanner can be mounted to one of the lids for recording and tracking of storage media placed within the bin.

14 Claims, 8 Drawing Sheets

(56) References Cited

U.S. PATENT DOCUMENTS

| | | |
|---|---|---|
| 9,776,192 B2 | 10/2017 | Ebadian et al. |
| 10,071,382 B1 | 9/2018 | Ebadian et al. |
| 10,242,699 B1 | 3/2019 | Ebadian et al. |
| 10,657,345 B1 | 5/2020 | Ebadian et al. |

* cited by examiner

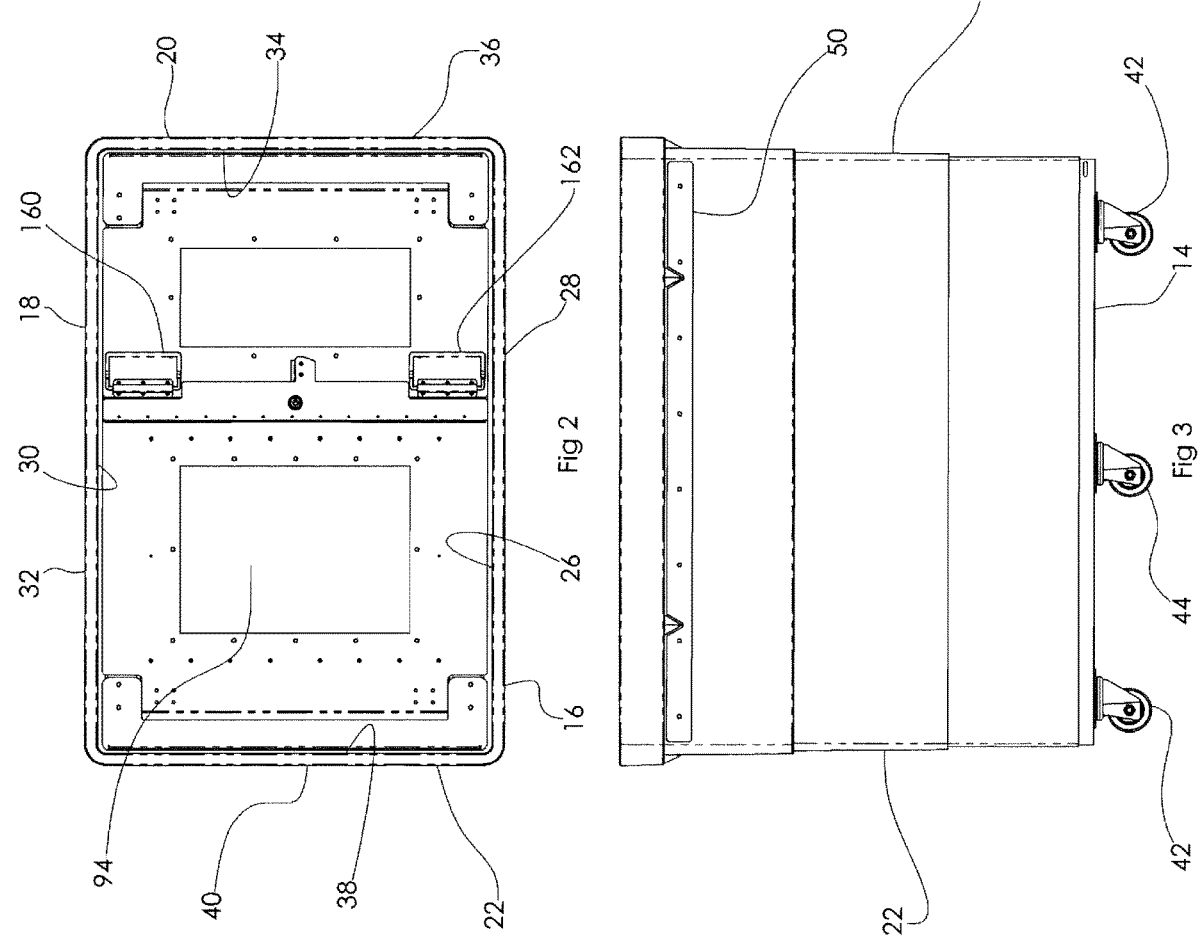

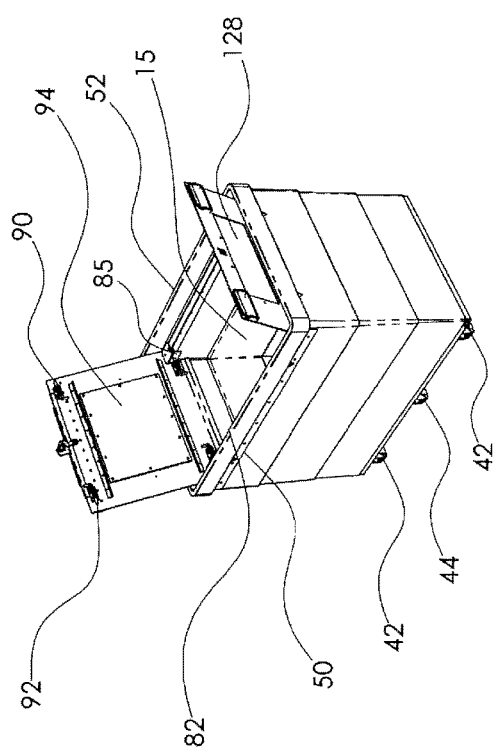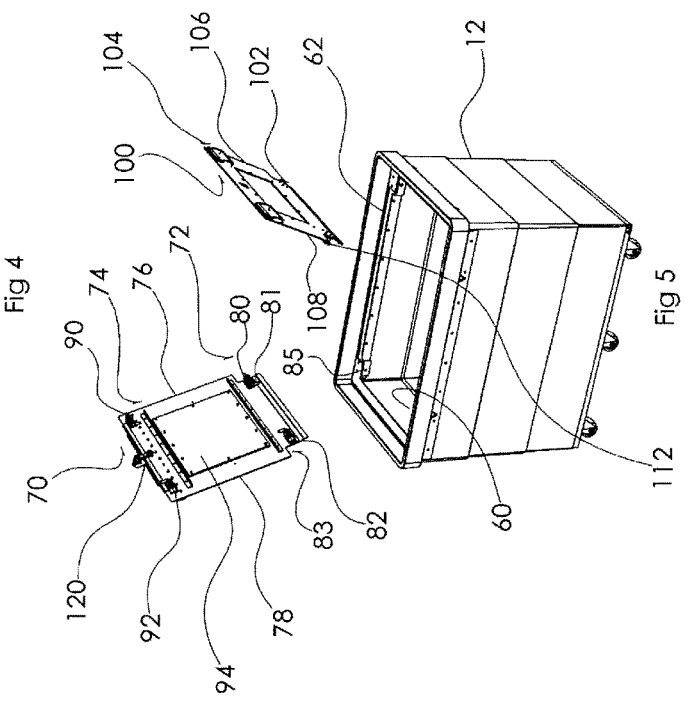

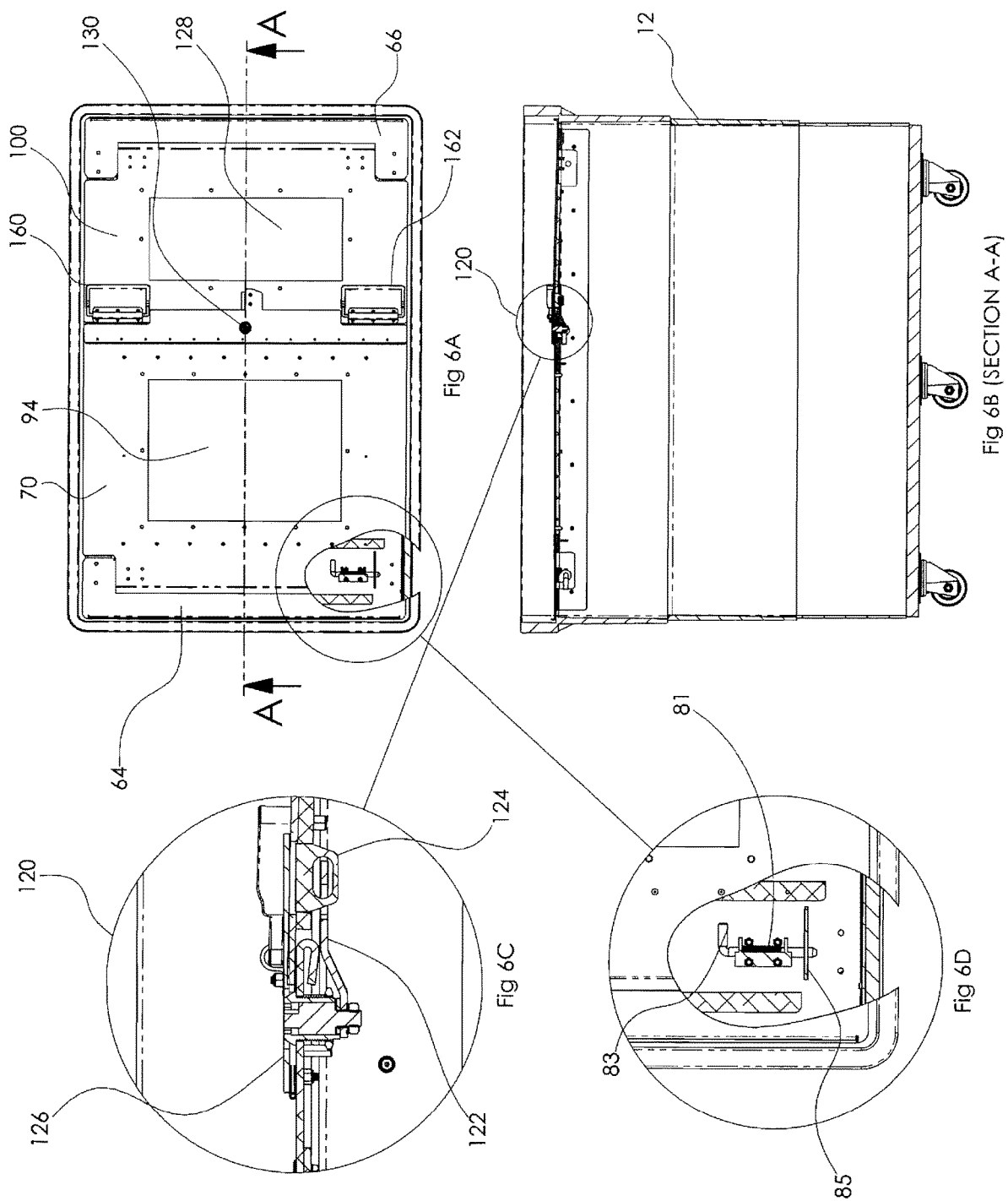

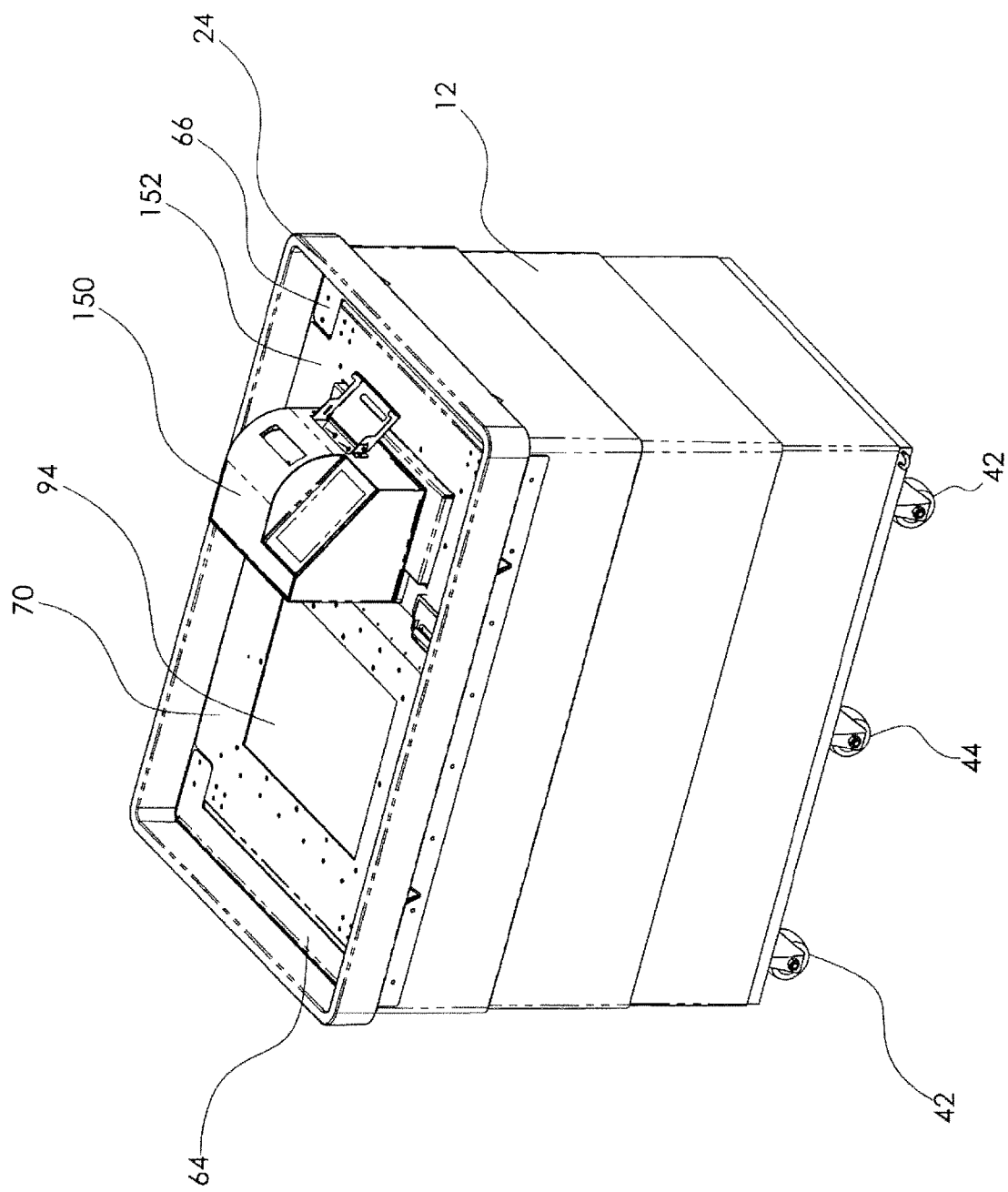

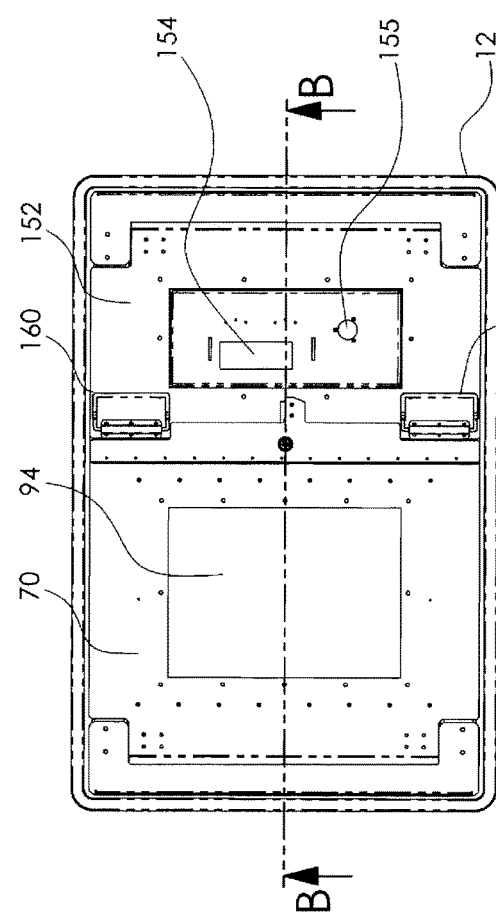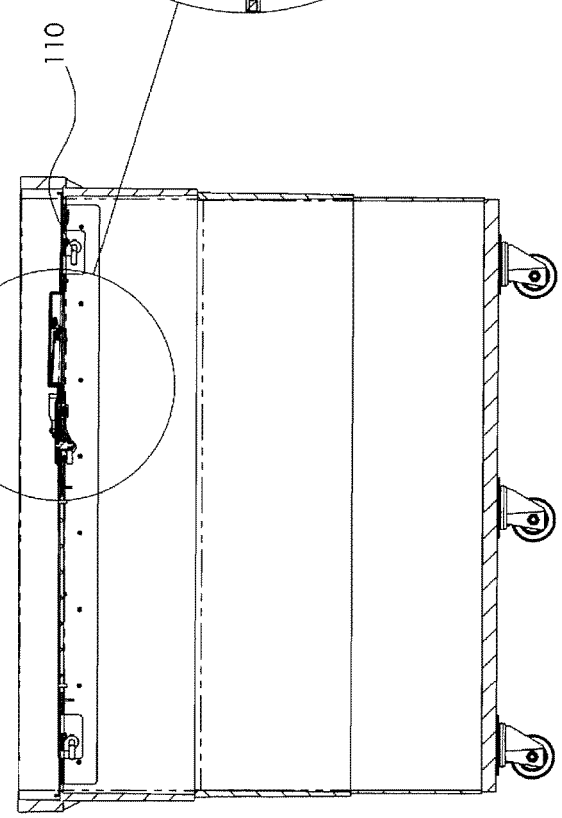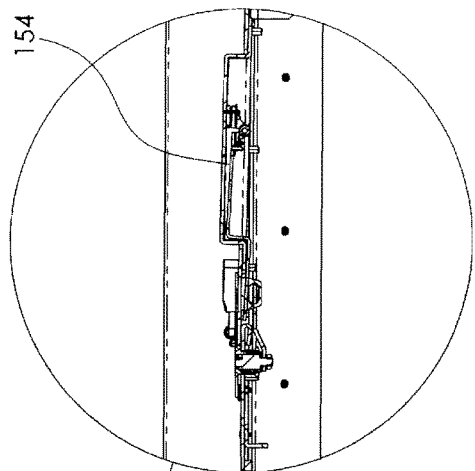

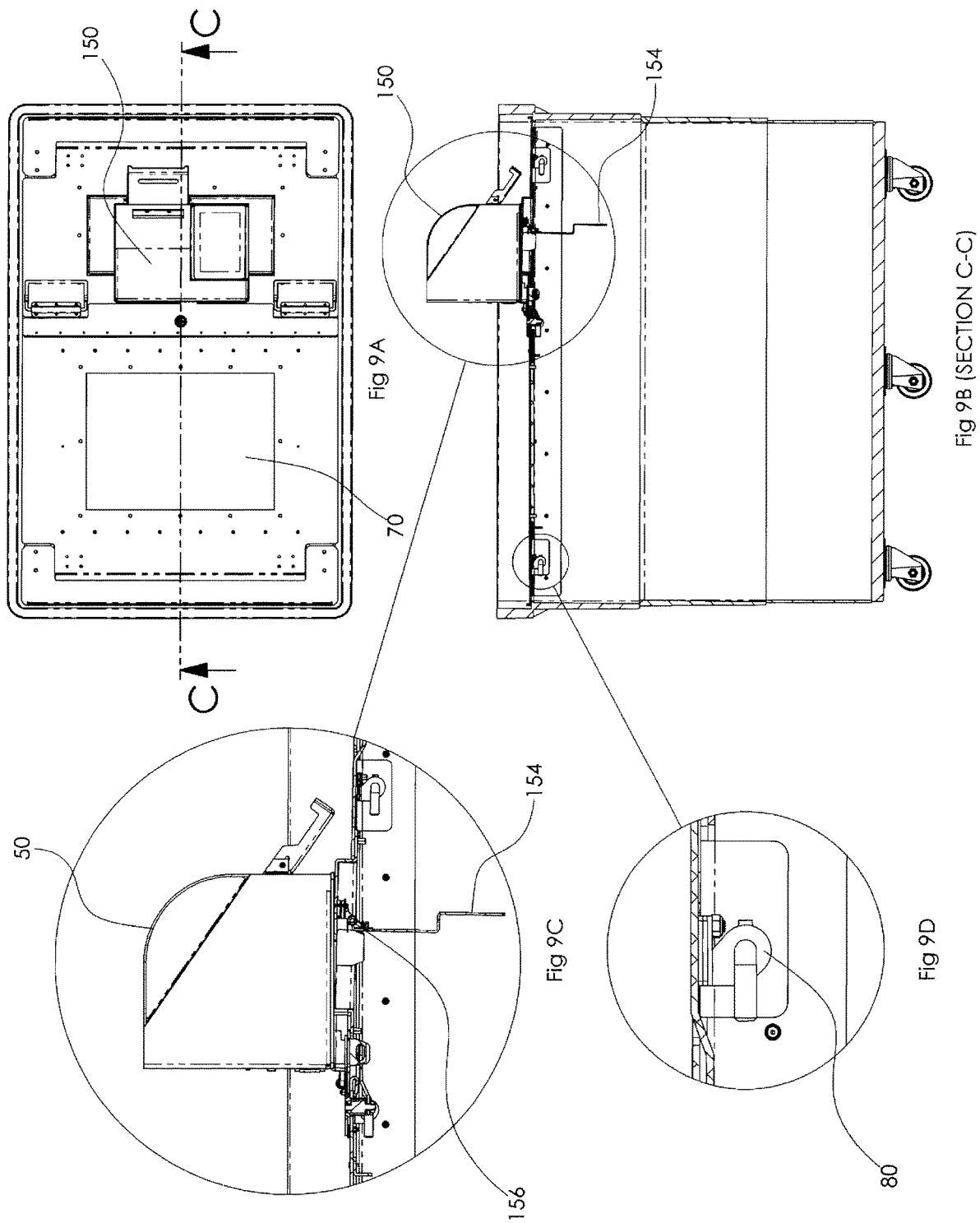

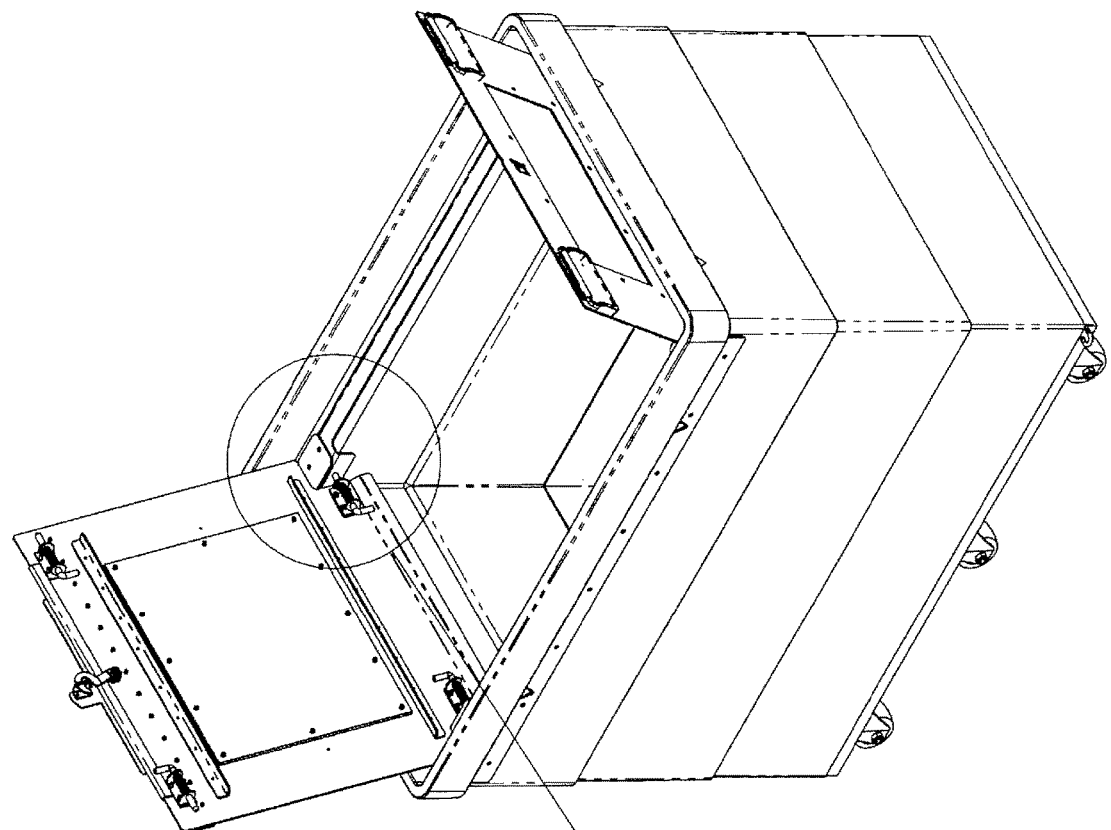
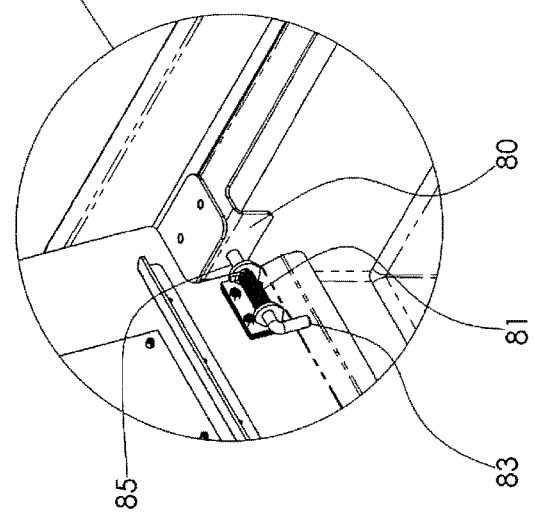
Fig 10

SECURITY BIN

FIELD OF THE INVENTION

This invention is related to the field of sensitive material storage and, in particular, to an apparatus to provide tamperproof storage of media held for destruction.

BACKGROUND OF THE INVENTION

As technology evolves, sensitive media in the form of digital data is stored on hard drives, disks and the like devices that can be easily copied, thereby exposing the media to misuse. Electronically stored media can contain extremely confidential information. For this reason, it is critical that sensitive information stored on a disk is disposed of in a manner where the information is absolutely unrecoverable. Various mechanisms exist wherein the digital data stored on a disk or like media is electronically or physically destroyed; the goal being to assure that any sensitive material on the disk has been rendered unusable, and proof of the destroyed disk exists.

Data destroying devices are described in Applicant's prior patents, including U.S. Pat. No. 7,324,321 for a Degaussing Apparatus; U.S. Pat. No. 7,852,590 for a Solid State Memory Decommissioner; U.S. Pat. No. 8,064,183 for a Capacitor Based Bi-Directional Degaussing Apparatus; U.S. Pat. No. 8,794,559 for a Solid State Storage Device Crusher; U.S. Pat. No. 9,776,192 for a Comminuting Apparatus; U.S. Pat. No. 10,071,382 for a Solid State Drive Disintegrator; U.S. Pat. No. 10,242,699 for a Single Pulse Degaussing Device; and U.S. Pat. No. 10,657,345 for a Media Destruction Verification Apparatus.

This invention is directed to either storage of media pending destruction or electronic waste for recycling/disposal. While it would be advantageous and beneficial to immediately destroy all media material the moment it is removed from use, in reality, most media is removed from use and transferred to another location for destruction. This transfer may or may not be on the premises and is typically accomplished in batches. An individual assigned to the task will typically wait until a quantity of media disks is received before initiating the destruction process.

What is lacking in the art is a low cost security bin for securely storing and transporting media disks before their destruction or electronic waste for recycling/disposal.

SUMMARY OF THE INVENTION

Disclosed is a security bin employing a commercially accepted rectangular plastic bin having a floor with four side walls extending upwardly therefrom forming an open top. The bin includes removable lids that are secured to the bin to prevent unauthorized access to the items placed therein. The lids are locked with a tamperproof flap and latching hook to prevent access to the bin contents. Plexiglass (acrylic) windows allow viewing of materials placed within the bin. Spring pins allow ease of lid removal to allow stacking of the bins for storage and shipping. An optional scanner can be mounted to one of the lids for logging of disks placed within the bin.

An objective of the invention is improving commercially available castor wheel based bins by providing tamperproof lockable lids to prevent unauthorized access to electronic waste such as media data materials transported in the bins.

Another objective of the invention is to provide a lid for a plastic bin having a tamperproof flap to prevent access to a lid locking mechanism.

Yet another objective of the invention is to provide interchangeable lids wherein an optional scanner may be employed to digitally log data of materials placed within the bin.

Still another objective of the invention is to provide removable lids to allow stacking of bins for storage and/or shipping.

Yet still another objective of the invention is to provide tamperproof storage bins that could be capable of securely holding a large amount of HDD's or SSD's, for example, upwards of five hundred 3.5" HDDs.

Another objective of the invention is to provide bin lids having plexiglass windows to allow viewing of materials placed within the bin.

Yet still another objective of the invention is to provide spring pins for ease of attaching and removing individual lids, said spring pins operatively associated with support brackets secured from along the interior of the bin.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE DRAWINGS

FIG. 2 is a top view thereof;
FIG. 3 is a side view thereof;
FIG. 4 is a perspective view thereof with the lids open;
FIG. 5 is a perspective view thereof with the lids detached;
FIG. 6A is a top view thereof with Section A-A cut lines;
FIG. 6B is a cross sectional view along Section A-A, illustrating a latching hook;
FIG. 6C is an enlarged view of the latching hook taken along Section A-A;
FIG. 6D is an enlarged break out section top of the cross brace holding the hinge member;
FIG. 7 is a perspective view of the security bin with an optional scanner;
FIG. 8A is a top view of the security bin with the scanner trap door having Section B-B cut lines;
FIG. 8B is a cross sectional view taken along Section B-B of the scanner trap door;
FIG. 8C is an enlarged view of the trap door;
FIG. 9A is a top view of the security bin with a scanner installed on the trap door Section C-C cut lines;
FIG. 9B is a cross sectional view of the scanner and trap door taken along Section C-C;
FIG. 9C is an enlarged view of the scanner and trap door;
FIG. 9D is an enlarged view of a hinge member;
and
FIG. 10 is a perspective view thereof with the lids open with an enlarged view of the hinge member.

DETAILED DESCRIPTION OF THE PREFERRED EMBODIMENT

Figure 1:
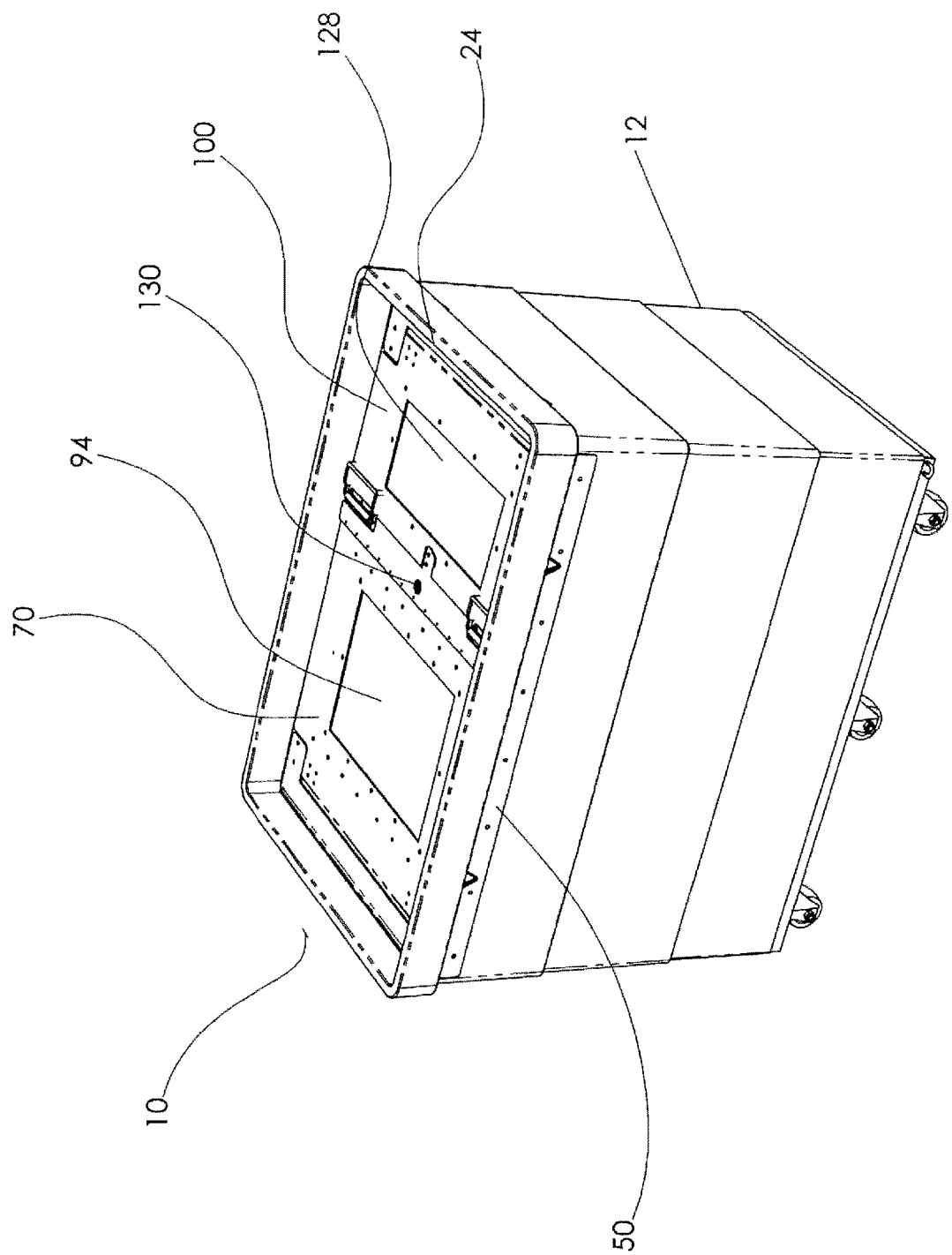
FIG. 1 is a perspective view of the security bin apparatus.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

In a preferred embodiment, the security bin 10 of the instant invention employs an industry accepted, substantially rectangular plastic bin base, referred to herein as a security bin 12, having a bottom wall 14 with two side walls 16, 18 and two end walls 020, 22 extending upwardly therefrom to form a continuous upper edge 24. The first side wall 16 has an inner surface 26 and an outer surface 28. The second side wall 18 has an inner surface 30 and an outer surface 32. The first end wall 20 has an inner surface 34 and an outer surface 36. The second end wall 22 has an inner surface 38 and an outer surface 40. The inner surfaces 26, 30, 34 and 38 and bottom wall 14 form a receptacle 15. The bottom wall 14 includes six wheels, namely a non-marring castor wheel 42 placed at each corner of the bottom 14 wall, and a rigid wheel 44 placed between the corners along each of the side walls 16, 18 of the bin base 12.

Outer wall support brackets 50 and 52 are formed from individual strips of steel and positioned along an outer surface of each side wall 16, and 18 proximate to the upper edge 24 of each wall. Bracket 50 is a mirror image of bracket 52.

Inner wall support brackets 60 and 62 are formed from individual strips of steel and positioned along an inner surface of each side wall 16, and 18 proximate to the upper edge 24 of each wall. Bracket 60 is a mirror image of bracket 62. The outer wall support brackets 50 and 52 are secured to the inner wall support brackets 60 and 62 by a plurality of fasteners. In one embodiment, the fasteners are carriage type bolts having a rounded end placed through the outer brackets with locking nuts secured to the bolt as it is placed through the inner brackets. Once a lid is locked in position, the brackets cannot be removed. The fasteners are constructed and arranged to allow attachment or removal only by accessing said inner brackets.

The first lid 70 defined by a first proximal end 72, a first distal end 74, and opposing side edges 76, 78. A hinge pin 80 is positioned alongside edge 76 and proximal end 72, and hinge pin 82 is positioned alongside edge 78 and proximal end 72. Hinge pins 80 and 82 are interchangeable with each other, as well as with the remainder of the hinge pins referred to in this specification. The element numbers are changed so as to indicate location. For clarity, hinge member 80 employs an L-shaped pin element 83 having a spring member 81 to maintain a distal end 85 in an outward position for insertion into an aperture. The distal end operates as a pivot point, allowing the lids to be rotated from a closed position to a raised position. For removal of a lid from the bin, the pin element 83 is pulled so as to overcome the spring member 81 biasing to allow retraction of the distal end 85 from its respective aperture. In this regard, pin members can be temporarily retracted by overcoming the spring force, allowing installation or removal of the lids. In this embodiment, lid 70 is rotatably secured to a cross brace 64 which is secured to inner wall support brackets 60 and 62. Similarly, lid 100 is rotatably secured to cross brace 66 which is secured to inner wall support brackets 60 and 62. The hinge 80 operates as a support for the pin element 83 and spring 81 which bias the pin element distal end into the aperture 85 of the cross member 62 allowing the distal end 74 of the lid 70 to pivot upwardly, allowing access to the receptacle 15.

Hinge pins 90 and 92 are positioned on each corner of the opposing side edges along the first distal end 74, which allows the first lid 70 to be secured to the inner bracket. Retracting of the hinge pins 90 and 92 along the distal end 74 allows the distal end 74 to pivot upwardly from a closed position. When hinge pins 80 and 82 are also retracted from the proximal end 72, together with the retracting of hinge pins 90 and 92, the first lid 70 will be detached from the bin base 12. The first bin lid 70 covers approximately one half of the opening when placed in a closed position. A plexiglass viewing window 94 is formed in a portion of said first lid 70 to allow viewing of materials placed within the receptacle 15.

A second lid 100 is defined by a second proximal end 102, a second distal end 104, and opposing side edges 106 and 108; a hinge pin 110 and 112 is positioned on each of the opposing side edges 106, 108 along the second distal end 104 to pivot from a lowered position, wherein the second lid 100 and the first lid 70 cover the opening to the receptacle 15 and are pivotable to a raised position wherein the second distal end 104 is raised to allow access to the receptacle 15. If both the first lid 70 and second lid 100 are removed, the side walls of the bin are constructed and arranged to allow stacking with a similar shaped security bin. Stacking allows for efficiency in storing and shipping.

A lock mechanism 120 is constructed and arranged to secure the first lid 70 to the second lid 100, wherein the lock mechanism can prevent access to the receptacle 15 while in a locked position, and allow the first lid 70 and the second lid 100 to pivot to an open position to allow access to said receptacle in an unlocked position. The locking mechanism 120 includes a latching hook 122 for engaging a latch receiver 124. A tamperproof flap 126 prevents access to the receptacle 15, unless access is gained by the key lock 130. In one embodiment, a plexiglass viewing panel 128 is formed in the lid to allow viewing of items placed within the receptacle 15.

In an alternative embodiment, a scanner mechanism 150 is employed for use in logging scanned media and transfer of the data to any device. The scanner 150 can be used to provide inventory control oversight and auditing. The scanner 150 utilizes a touch screen, and can read 1D and 2D barcodes placed on storage media. The scanner 150 will automatically eject bad reads. The scanner 150 is used to prevent data falsification, and the data scanned may include operator ID, Date Code, Scanner serial numbers, tamper events, barcode numbers, media images, and so forth. RFID 155 enabled lids are utilized to trace and audit unsanitized media.

FIG. 8A illustrates a security bin 12 receptive to the scanner by use of a second lid 152 having the same hinge pins as per the previous embodiment. FIG. 8A depicts the Section B-B cut lines to illustrate a sectional view of a trap door 154 in a closed position, which allows the attachment and removal of the scanner 150, linking above the RFID 155, without affecting the securing of the bin. Handles 160 and 162 are positioned on an upper surface of the second lid 152 along the distal edge for ease of opening.

FIGS. 9A-9C depict the scanner 150 mounted to the security bin 12, as further illustrated in FIG. 7. The trap door 154 is illustrated in an open position. The trap door 154 is spring loaded 156, which causes the door to close upon removal of the scanner 150. Once attached, the scanner becomes the preferred manner in which to place storage media into the bin. The scanner device including sufficient memory to record sufficient data regarding each storage media placed therein for ease of tracking and forming a chain of possession.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A security bin comprising:
    a substantially rectangular plastic bin having a bottom wall with two side walls and two end walls extending upwardly therefrom to form a continuous upper edge, each said side wall and said end wall having an inner surface and an outer surface, said inner surface of said side wall, said end walls, and said bottom wall forming a receptacle;
    outer wall support brackets formed from individual strips of steel positioned along the outer surface of each said side wall proximate to said upper edge of each said wall;
    inner wall support brackets formed from individual strips of steel positioned along the inner surface of each said side wall proximate to said upper edge of each said wall, said outer wall support brackets secured to said inner wall support brackets by a plurality of fasteners;
    a first lid defined by a first proximal end, a first distal end, and opposing side edges, a hinge pin positioned on said opposing side edges along said first distal end and said first proximal end, allowing the first lid to be secured to said inner bracket, wherein retracting of said hinge pins along the distal end allows said distal end to pivot from a closed position to an open position, wherein retracting of said hinge pins along said proximal and distal ends allows said first lid to be detached from said inner brackets;
    a second lid defined by a second proximal end, a second distal end, and opposing side edges, a hinge pin positioned on each said opposing side edge along said second proximal end which allows the second lid to pivot from a lowered position, wherein said second lid and said first lid cover an opening of said receptacle and are pivotable to a raised position, wherein said second distal end is raised to allow access to said receptacle; and
    a lock mechanism constructed and arranged to secure said first lid to said second lid, wherein said lock mechanism can prevent access to said receptacle while in a locked position and allow said first and second lid to pivot to an open position to allow access to said receptacle in an unlocked position.

2. The security bin according to claim 1 wherein said fasteners are constructed and arranged to allow attachment or removal only by accessing said inner brackets.

3. The security bin according to claim 1 wherein each said hinge pin on said first lid is spring loaded, each said hinge pin biased outwardly, wherein retraction of each said hinge pin allows removal of said first lid.

4. The security bin according to claim 1 wherein each said hinge pin on said second lid is spring loaded, each said hinge pin biased outwardly, wherein retraction of at least one said hinge pin allows removal of said second lid.

5. The security bin according to claim 1 wherein the bottom wall and said side walls are constructed and arranged to allow stacking with a similar shaped security bin upon removal of said first and second lids.

6. The security bin according to claim 1 including a plurality of castor wheels depending from said bottom wall.

7. The security bin according to claim 1 wherein said lock mechanism includes a latching hook insertable into a latch receptacle for securing said first lid to said second lid.

8. The security bin according to claim 1 including at least one handle positioned on an upper surface of said second lid along said distal edge.

9. The security bin according to claim 1 wherein said second lid includes a spring loaded trap door constructed and arranged to receive media disks into said receptacle.

10. The security bin according to claim 9 including a scanner device securable to said trap door, said scanner device scanning each media disk placed through said trap door and storing information about each said media disk in memory.

11. The security bin according to claim 10 wherein said scanner device reads 1D and 2D barcodes placed on storage media, allowing passage of storage media when the barcode is read and rejection of storage media when the barcode is unreadable.

12. The security bin according to claim 1 including a plexiglass viewing window formed in a portion of said first lid.

13. The security bin according to claim 1 including a plexiglass viewing window formed in a portion of said second lid.

14. The security bin according to claim 1 including a swivel castor wheel secured to said bottom wall near each corner, and one rigid castor centrally disposed between each said end wall along each said side wall.

* * * * *